United States Patent
Moore

(10) Patent No.: US 12,054,306 B2
(45) Date of Patent: Aug. 6, 2024

(54) CORRUGATED ALTERNATING DISPLACEMENT CUSHION

(71) Applicant: Sonoco Development, Inc., Hartsville, SC (US)

(72) Inventor: Clifton Thomas Moore, Murfreesboro, TN (US)

(73) Assignee: Sonoco Development, Inc., Hartsville, SC (US)

( * ) Notice: Subject to any disclaimer, the term of this patent is extended or adjusted under 35 U.S.C. 154(b) by 403 days.

(21) Appl. No.: 17/199,058

(22) Filed: Mar. 11, 2021

(65) Prior Publication Data
US 2022/0289428 A1 Sep. 15, 2022

(51) Int. Cl.
*B65D 19/00* (2006.01)
*B32B 3/30* (2006.01)
*B32B 29/00* (2006.01)
*B65D 81/107* (2006.01)

(52) U.S. Cl.
CPC ............ *B65D 19/0026* (2013.01); *B32B 3/30* (2013.01); *B32B 29/005* (2013.01); *B65D 81/107* (2013.01); *B65D 2519/00019* (2013.01); *B65D 2519/00054* (2013.01); *B65D 2581/053* (2013.01); *Y10T 428/24281* (2015.01)

(58) Field of Classification Search
CPC ......... B32B 3/30; B32B 29/005; B65D 19/00; B65D 19/0026; B65D 81/05; B65D 81/107; B65D 2519/00019; B65D 2581/05; B65D 5/50
USPC ....................................................... 206/521
See application file for complete search history.

(56) References Cited

U.S. PATENT DOCUMENTS

| | | | |
|---|---|---|---|
| 1,020,567 A | | 3/1912 | Moeller |
| 1,218,872 A | | 3/1917 | Lafore |
| 2,593,430 A | * | 4/1952 | Frankenstein ....... B65D 5/5038 206/217 |
| 2,791,369 A | | 5/1957 | Paige |
| 3,012,747 A | | 12/1961 | Greene |
| 3,419,459 A | | 12/1968 | Haren |
| 4,993,580 A | | 2/1991 | Smith |

(Continued)

FOREIGN PATENT DOCUMENTS

| | | |
|---|---|---|
| EP | 1547760 A1 | 6/2005 |
| EP | 1842779 A1 | 10/2007 |
| WO | 9118807 A1 | 12/1991 |

OTHER PUBLICATIONS

Extended European Search Report related to Application No. 22158806.4; reported on Apr. 10, 2022.

(Continued)

*Primary Examiner* — Bryon P Gehman
(74) *Attorney, Agent, or Firm* — von Briesen & Roper, s.c.

(57) ABSTRACT

A corrugated alternate displacement cushion may be formed from a corrugated cardboard sheet having cutout rows of cutout sections that are spaced in the transverse direction across the corrugated cardboard sheet and separated by corresponding lands. The cutout sections of adjacent cutout rows do not overlap in the transverse direction. When the corrugated cardboard sheet is folded up around transverse creases, inner and outer sides of the cutout sections may be covered by lands of other cutout rows such that air pockets defined by the cutout sections are formed within the corrugated alternate displacement cushion.

20 Claims, 6 Drawing Sheets

(56) References Cited

U.S. PATENT DOCUMENTS

| | | | |
|---|---|---|---|
| 5,218,913 | A | 6/1993 | Winebarger et al. |
| 5,402,930 | A | 4/1995 | Storms et al. |
| 5,543,205 | A | 8/1996 | Liebel |
| 6,171,680 | B1 | 1/2001 | Fahmy |
| 6,815,022 | B2 | 11/2004 | Renck et al. |
| 9,090,379 | B2 | 7/2015 | Nelson |
| 10,059,423 | B2 | 8/2018 | Smithson et al. |
| 2006/0141179 | A1 | 6/2006 | van de Camp |
| 2022/0081153 | A1* | 3/2022 | Fernandez ........... B65D 81/053 |

OTHER PUBLICATIONS

Canadian Office Action related to Application No. 3, 151,726; reported on May 23, 2023.

* cited by examiner

CORRUGATED ALTERNATING DISPLACEMENT CUSHION

TECHNICAL FIELD

The present disclosure relates generally to cushioning for containers and, more particularly, to corrugating alternating displacement cushion for use in containers such as shipping containers.

BACKGROUND

Cushioning is necessary for shipping of products and components that may be damaged due to impacts and jostling during transit. Cushioning is particularly necessary for large, heavy products that are shipped in cardboard containers. The current solution for shipping such products is to use expanded polystyrene (EPS) foam board insulation. However, EPS is not an eco-friendly material. While EPS performs satisfactorily in regards to function, the current ecological climate is creating demand for more easily recyclable options for cushioning large, heavy products during shipping with more recyclable cushioning products.

SUMMARY OF THE DISCLOSURE

In one aspect of the present disclosure, a corrugated alternate displacement cushion is disclosed. The corrugated alternate displacement cushion may include a corrugated cardboard sheet having a longitudinal direction and a transverse direction that is perpendicular to the longitudinal direction, a first cutout row having first cutout sections in the corrugated cardboard sheet that are spaced in the transverse direction across the corrugated cardboard sheet and separated by first lands, and a second cutout row having second cutout sections in the corrugated cardboard sheet that are spaced in the transverse direction across the corrugated cardboard sheet and separated by second lands, wherein the first cutout sections do not overlap the second cutout sections in the transverse direction. When the corrugated cardboard sheet is folded up to form the corrugated alternate displacement cushion with a rectangular cross-section, the first lands overlay the second cutout sections and the second lands overlay the first cutout sections with the first lands and the second lands overlapping and engaging such that air pockets defined by the first cutout sections and the second cutout sections are formed within the corrugated alternate displacement cushion.

In another aspect of the present disclosure, a corrugated alternate displacement cushion is disclosed. The corrugated alternate displacement cushion may be fabricated from a corrugated cardboard sheet having a longitudinal direction and a transverse direction that is perpendicular to the longitudinal direction. The corrugated alternate displacement cushion may include horizontal plies of the corrugated cardboard sheet that are stacked vertically, vertical plies of the corrugated cardboard sheet, wherein each of the vertical plies connects a pair of the horizontal plies to each other, and first cutout sections defined in a first horizontal ply of the horizontal plies. The first cutout sections may be spaced in the transverse direction across the first horizontal ply and may be separated by first lands of the first horizontal ply. The first cutout sections may be enclosed by a second horizontal ply of the horizontal plies that is vertically above the first horizontal ply and a third horizontal ply of the horizontal plies that is vertically below the first horizontal ply to define first air pockets within the corrugated alternate displacement cushion.

In a further aspect of the present disclosure, a corrugated cardboard sheet is disclosed. The corrugated cardboard sheet may include creases extending in a transverse direction of the corrugated cardboard sheet that is perpendicular to a longitudinal direction of the corrugated cardboard sheet. The creases may define horizontal plies in the corrugated cardboard sheet and vertical plies in the corrugated cardboard sheet, wherein each of the vertical plies is disposed between a pair of horizontal plies, and wherein the horizontal plies are stacked vertically when the corrugated cardboard sheet is folded up around the creases. The corrugated cardboard sheet may further include first cutout sections and first lands extending in the longitudinal direction from a first horizontal ply of the horizontal plies across a first vertical ply of the vertical plies and at least partially across a second horizontal ply of the horizontal plies, wherein the first cutout sections are spaced in the transverse direction and separated by the first lands. The corrugated cardboard sheet may further include second cutout sections and second lands extending in the longitudinal direction from a third horizontal ply of the horizontal plies across a third vertical ply of the vertical plies and at least partially across a fourth horizontal ply of the horizontal plies, wherein the second cutout sections are spaced in the transverse direction and separated by the second lands, wherein the first cutout sections and the second cutout sections do not overlap in the transverse direction, and wherein the first cutout sections and the second cutout sections have a cutout width and the first lands and the second lands have a land width that is greater than the cutout width. When the corrugated cardboard sheet is folded up around the creases, the first horizontal ply and the second lands may enclose the first cutout sections to form first air pockets, and the first horizontal ply and the first lands may cover an interior of the second cutout sections.

Additional aspects are defined by the claims of this patent.

DETAILED DESCRIPTION

Figure 1:
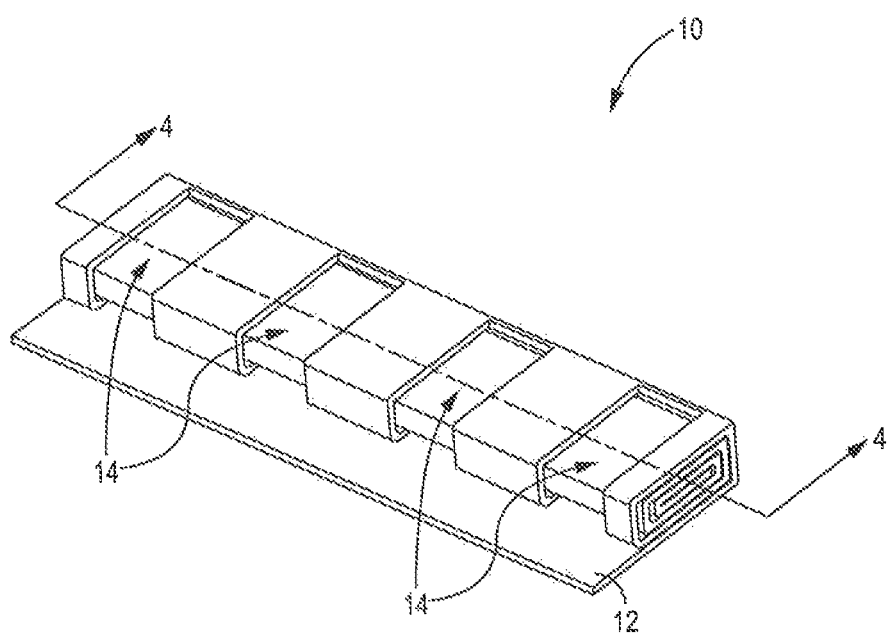
FIG. 1 is an isometric view of a corrugated alternating displacement cushion in accordance with the present disclosure.

FIG. 1 illustrates an exemplary embodiment of a corrugated alternating displacement cushion 10 in accordance with the present disclosure. The cushion 10 is formed from a corrugated cardboard sheet 12 that is folded up on itself to form alternating horizontal and vertical plies as described more fully below. The cardboard sheet 12 has cutout sections therein that are sized and positioned to define a plurality of air pockets 14 providing space for some deflection of the plies when a product supported by the cushion 10 moves relative to the cushion 10. The deflection damps the movement of the product to reduce accelerations and decelerations of the product during shipment.

Figure 2:
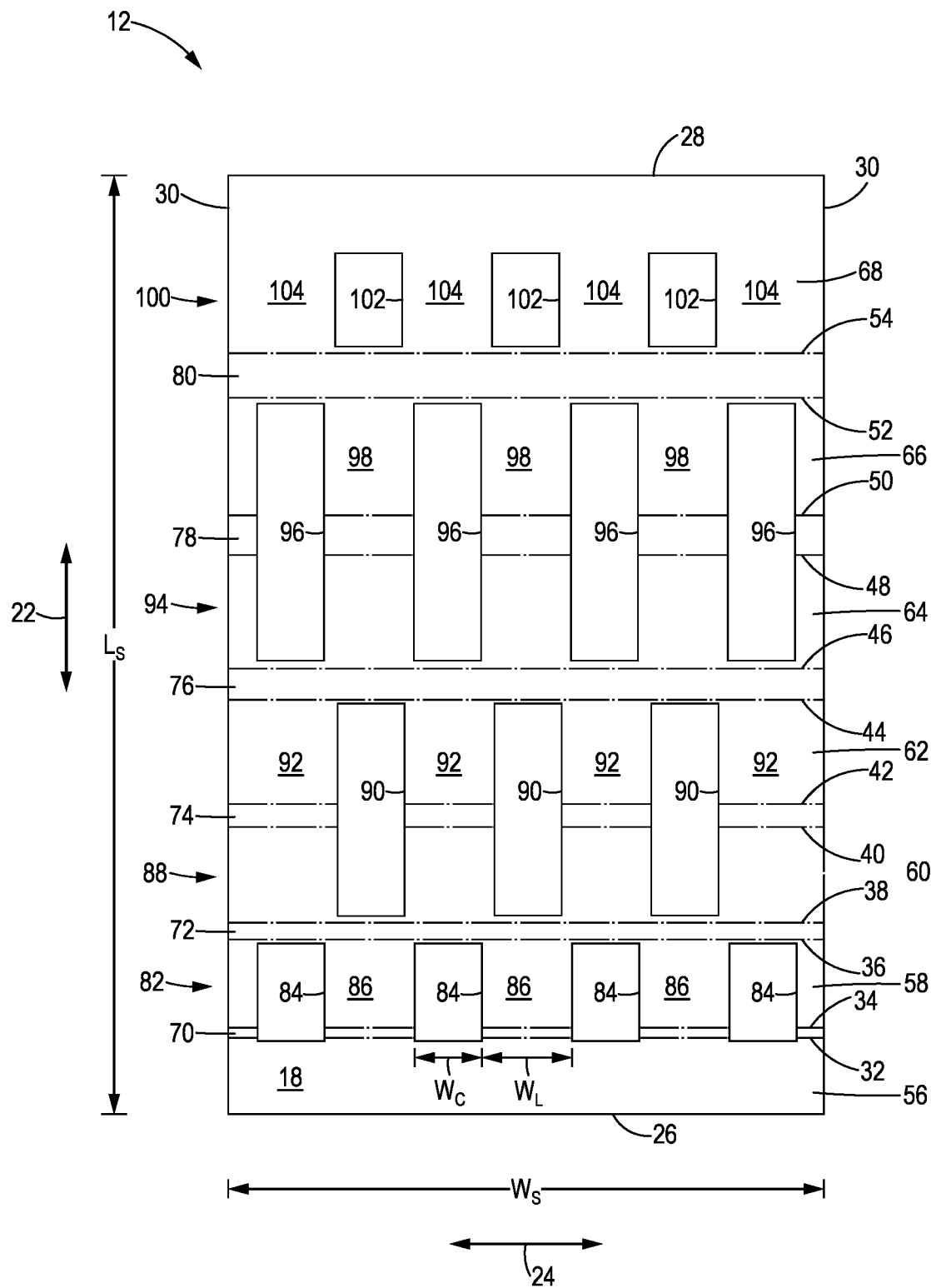
FIG. 2 is a front view of a corrugated cardboard sheet from which the corrugated alternating displacement cushion of FIG. 1 may be formed.
Figure 3A:
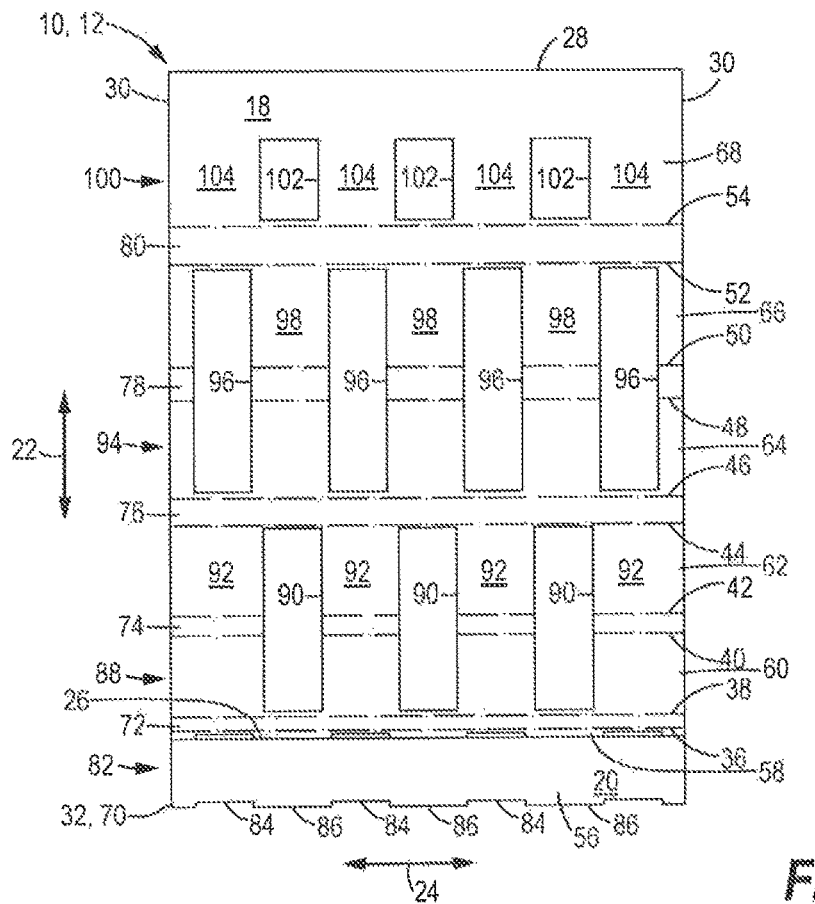
FIGS. 3A-3F are a sequence front views of the corrugated cardboard sheet of FIG. 2 as the corrugated cardboard sheet is folded up into the corrugated alternating displacement cushion of FIG. 1.
Figure 3B:
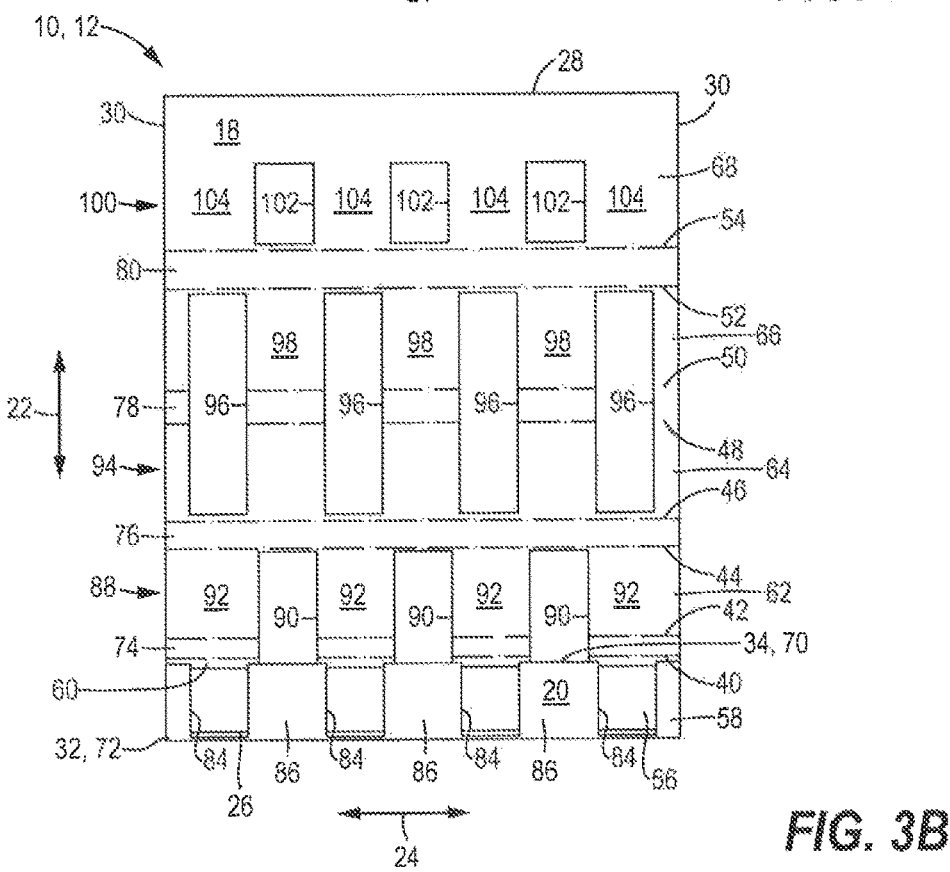

Referring to FIG. 2, an embodiment of the cardboard sheet 12 is illustrated prior to the cardboard sheet 12 being rolled into the cushion 10. The cardboard sheet 12 may be a standard corrugated cardboard sheet having at least one fluted sheet between an inner liner forming an inner surface 18 and an outer liner forming an outer surface 20 (FIG. 3A). The cardboard sheet 12 is rectangular and has a greater sheet length $L_S$ in a longitudinal direction 22 than a sheet width $W_S$ in a transverse direction 24 that is perpendicular to the longitudinal direction 22. The cardboard sheet 12 has an inner transverse edge 26 that is parallel to the transverse direction 24 and will be positioned within the cushion 10, an outer transverse edge 28 opposite the inner transverse edge 26 that will be on the exterior of the cushion 10, and oppositely disposed lateral edges 30 that are parallel to the longitudinal direction 22 and extend between the transverse edges 26, 28. Channels within the cardboard sheet 12 formed by the fluting of the fluted sheet may be parallel to the longitudinal direction 22 and extend from the inner transverse edge 26 to the outer transverse edge 28.

The cardboard sheet 12 is subdivided by transverse creases into alternating sections that will form horizontal and vertical plies of the cushion 10. In the illustrated embodiment, in the longitudinal direction 22 starting at the inner transverse edge 26, the sheet has 12 transverse creases 32-54 extending between the lateral edges 30. A first horizontal ply 56 may be defined by the inner transverse edge 26 and the first crease 32. Horizontal plies 58-66 may be defined by pairs of creases 34/36, 38/40, 42/44, 46/48, 50/52, respectively, and a seventh horizontal ply 68 may be defined by the last crease 54 and the outer transverse edge 28. Six vertical plies 70-80 may be defined by pairs of creases 32/34, 36/38, 40/42, 44/46, 48/50, 52/54, respectively. As the cardboard sheet 12 is rolled or folded up about the creases 32-54, the depth and thickness of the cushion 10 increases as each layer or ply is added. To accommodate the changes, the longitudinal dimensions or depths of the horizontal plies 56-68 and the vertical plies 70-80 increase as their position becomes more remote from the inner transverse edge 26 increases.

It should be noted that the terms "horizontal" and "vertical" are relative terms used herein to distinguish between the portions into which the cardboard sheet 12 and the relative orientations of the plies 56-68, 70-80, and to correspond to the orientation of the cushion 10 as illustrated herein. These terms do not impose requirements and are not limiting as to the orientation of the cushion 10 and the plies 56-68, 70-80 when implemented in shipping containers or applications. For example, the horizontal plies 56-68 may be oriented vertically and the vertical plies 70-80 may be oriented horizontally if the cushion 10 is rotated by 90° about an axis parallel to the transverse direction 24, and all the plies 56-68, 70-80 may be oriented vertically if the cushion 10 is rotated so that the cushion 10 stands on one of the lateral edges 30.

The air pockets 14 may be formed in the cushion 10 by providing a series of cutout sections in the cardboard sheet 12. A first cutout row 82 having four first cutout sections 84 may be proximate the inner transverse edge 26 relative to other cutout rows. The first cutout sections 84 may be evenly spaced in the transverse direction 24 and separated by three first lands 86. In the longitudinal direction 22, the first cutout sections 84 start in the first horizontal ply 56 proximate the first crease 32, and traverse the first vertical ply 70 and the second horizontal ply 58 to a position proximate the third crease 36. A second cutout row 88 may include three second cutout sections 90 spaced in the transverse direction and separated by second lands 92. The second cutout sections 90 and the second lands 92 may extend longitudinally across the third and fourth horizontal plies 60, 62 and the third vertical ply 74 from a position proximate the fourth crease 38 to a point proximate the seventh crease 44.

As shown, the second cutout sections 90 do not overlap with the first cutout sections 84 in either the longitudinal direction 22 or the transverse direction 24. The first and second cutout sections 84, 90 may have a cutout width $W_C$ in the transverse direction 24, and the first and second lands 86, 92 may have a land width $W_L$ in the transverse direction 24 that is wider than the cutout width $W_C$. The first cutout sections 84 may be proximately centered with respect to the corresponding second lands 92 in the transverse direction 24 and the second cutout sections 90 are approximately centered with respect to the first lands 86 in the transverse direction 24. With this arrangement, the first lands 86 overlap with the second lands 92 in the transverse direction 24. A third row 94 of four third cutout sections 96 may be formed in the fifth and sixth horizontal plies 64, 66 and the fifth vertical ply 78 as shown. The third cutout sections 96 are separated by third lands 98 and may be approximately aligned in the transverse direction 24 with corresponding first cutout sections 84 of the first cutout row 82. A fourth cutout row 100 of three fourth cutout sections 102 may be formed in the seventh horizontal ply 68 starting proximate the twelfth crease 54 and may be separated by fourth lands 104. The fourth cutout sections 102 may be approximately aligned in the transverse direction 24 with corresponding second cutout sections 90 of the second cutout row 88.

As the cardboard sheet 12 is rolled up into the cushion 10, the cutout sections 84, 90, 96, 102 and the lands 86, 92, 98, 104 combined to define alternating air pockets 14 within the cushion 10. The sequence of rolling up the cardboard sheet 12 into the cushion 10 is illustrated in FIGS. 3A-3F. To start, as shown in FIG. 3A, the inner transverse edge 26 and the first horizontal ply 56 are folded inward about the first and second creases 32, 34. The portion of the inner surface 18 of the cardboard sheet 12 at the first horizontal ply 56 faces the portion of the inner surface 18 at the second horizontal ply 58 such that the first horizontal ply 56 may substantially cover the first cutout sections 84. The portion of the outer surface 20 of the cardboard sheet 12 at the first horizontal ply 56 faces away from the second horizontal ply 58. As the first and second horizontal plies 56, 58 are folded over the third and fourth creases 36, 38 (FIG. 3B), the portion of the outer surface 20 at the first horizontal ply 56 faces the portions of the inner surface 18 at the second lands 92 within the third horizontal ply 60. At this point, the first horizontal ply 56 forms inner surfaces of air pockets defined by the first cutout sections 84, and the first and second horizontal plies 56, 58 begin to cover the second cutout sections 90 at the inner surface 18.

Figure 3C:
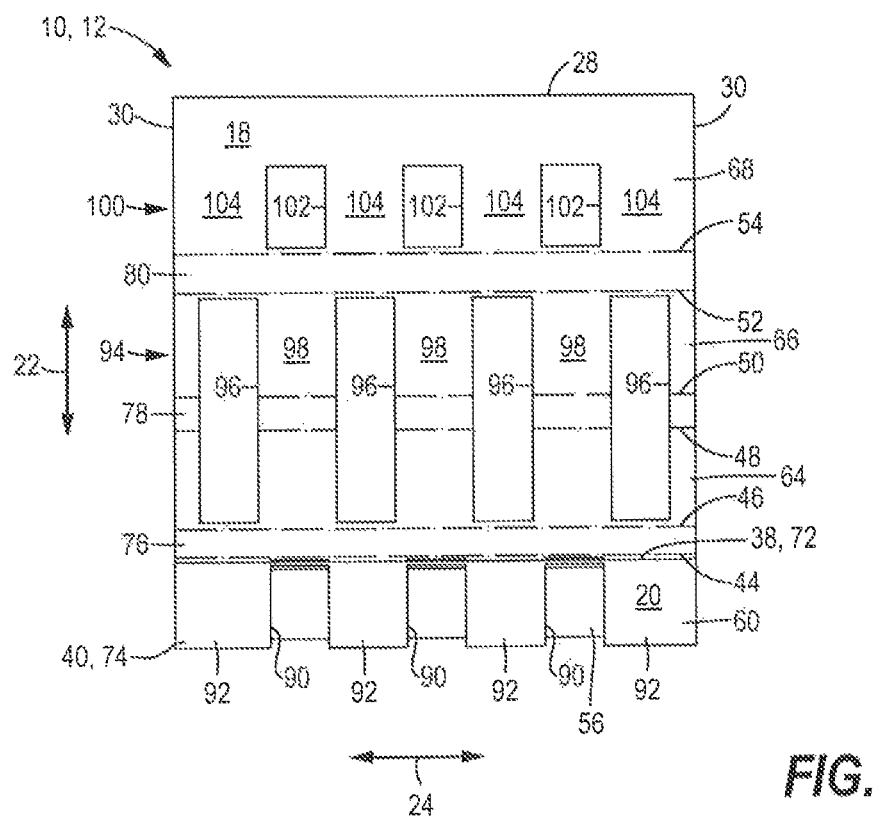

FIG. 3C illustrates the cardboard sheet 12 with the first, second and third horizontal plies 56-60 folded over the fifth and sixth creases 40, 42. The outer surface 20 at the second horizontal ply 58 faces the inner surface 18 at the fourth horizontal ply 62. The first lands 86 cover the remaining portion of the inner surface 18 at the second cutout sections 90 so that the first horizontal ply 56 and the first lands 86 form inner surfaces of air pockets defined by the second cutout sections 90. The inner surface 18 at the second lands 92 faces the outer surface 20 at the first cutout sections 84 to fully enclose the corresponding air pockets, Because the first and second lands 86, 92 are wider than the first and second cutout sections 84, 90, lateral portions of the first and second lands 86, 92 may overlap, face and engage at the lateral edges of the first and second cutout sections 84, 90.

Figure 3D:
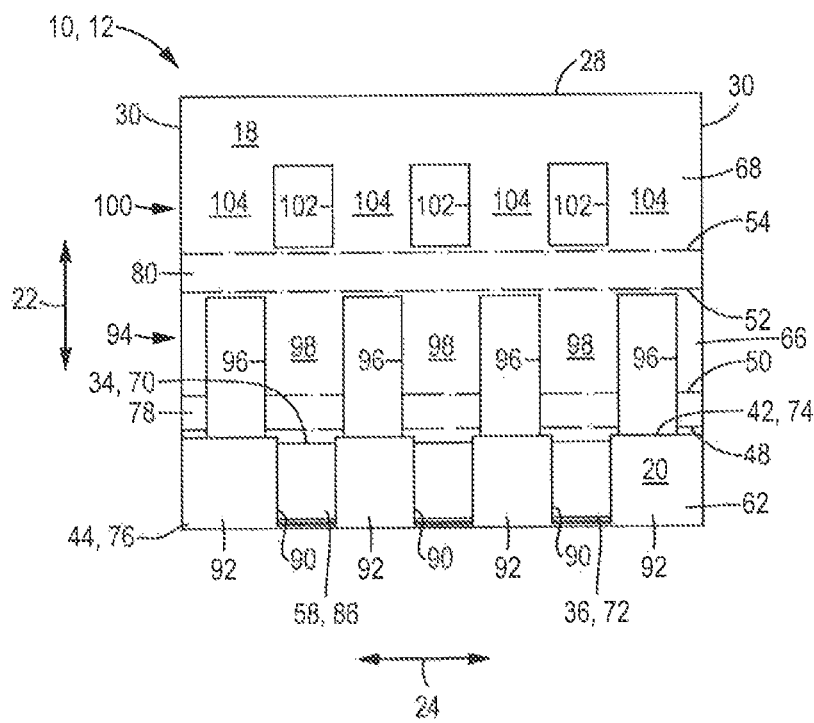
Figure 3E:
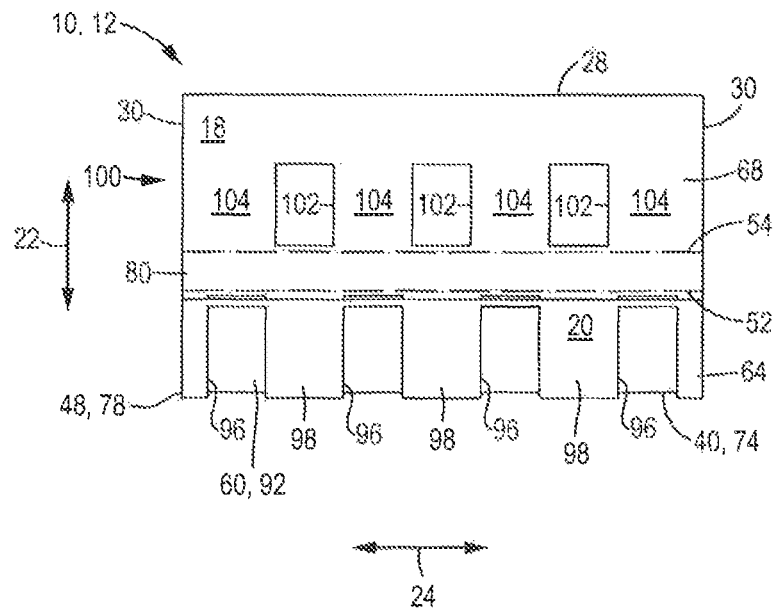

FIGS. 3D and 3E illustrate the cardboard sheet 12 as the horizontal plies 56-62 are folded over the seventh and eighth creases 44, 46, and the horizontal plies 56-64 are folded over the ninth and tenth creases 48, 50, respectively, Through these two steps, the inner surface 18 at the third lands 98 wraps around the second cutout sections 90, The inner surface 18 at the third lands 98 faces and engages the outer surface 20 at the second lands 92 to enclose the air pockets defined by the second cutout sections 90. At the same time, the outer surface 20 at the second lands 92 faces the inner surface 18 at the third cutout sections 96 to define inward extents of the air pockets defined by the third cutout sections 96.

Figure 3F:
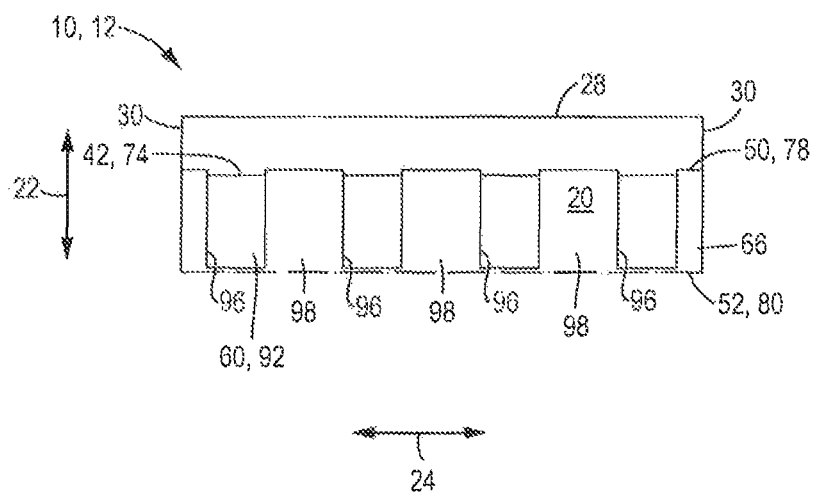

The cushion 10 after the final fold of the horizontal plies 56-66 around the creases 52, 54 is shown in FIG. 3F. The inner surface 18 at the fourth lands 104 faces the outer surface 20 at the third cutout sections 96 in the fifth horizontal ply 64 to begin enclosing the air pockets defined by the third cutout sections 96. The outer surface 20 at the third lands 98 of the fifth horizontal ply 64 faces the inner surface 18 at the fourth cutout sections 102 to begin enclosing the air pockets defined by the fourth cutout sections 102. As illustrated, the seventh horizontal ply 68 extends beyond the fifth vertical ply 78, and the cutout sections 96, 102 are at least partially left open to the exterior of the cushion 10. In alternative embodiments, the cardboard sheet 12 may extend further in the longitudinal direction and have additional horizontal and vertical plies (without cutout sections) and corresponding creases that may be folded around the horizontal plies 66, 68 and the vertical plies 78, 80 to fully enclose the air pockets defined by the cutout sections 96, 102.

Figure 4:
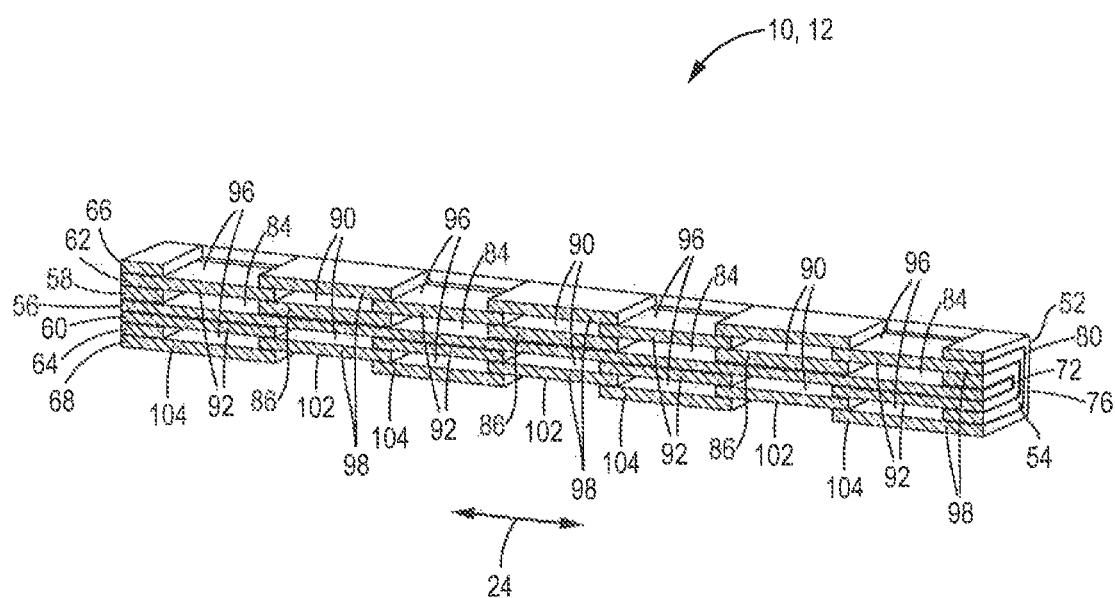
FIG. 4 is an isometric cross-sectional view of the corrugated alternating displacement cushion of FIG. 1 taken through line 4-4 of FIG. 1.

The cross-sectional view of FIG. 4 illustrates an alternating configuration of the air pockets defined by the cutout sections 84, 90, 96, 102 within the cushion 10. The first and third cutout sections 84, 96 are vertically aligned, and the second and fourth cutout sections 90, 102 are vertically aligned and alternated with the first and third cutout sections 84, 96 in the transverse direction 24. Due to the dimensioning of the cutout width $W_C$ of the cutout sections 84, 90, 96, 102 and the land width $W_L$ of the lands 86, 92, 98, 104, the lands 86, 92, 98, 104 on vertically adjacent horizontal plies 56-68 overlap to provide vertical support for the cushion 10 while allowing some displacement and cushioning due to the presence of the air pockets. The cutout width $W_C$ and the land width $W_L$ can be varied to adjust the overlap and engagement of the lands 86, 92, 98, 104 to vary the amount of cushioning provided by the cushion 10. If the cutout width $W_C$ is decreased and the land width $W_L$ is increased, the overlap between the lands 86, 92, 98, 104 is greater and the cushion 10 is more rigid. Conversely, increasing the cutout width $W_C$ and decreasing the land width $W_L$ will decrease the overlap between the lands 86, 92, 98, 104 and increase the cushioning provided by the cushion 10. These dimensions, the number of air pockets and the number of plies can be varied to achieve a desired balance of displacement and shock absorption to protect the product during shipment.

INDUSTRIAL APPLICABILITY

The cushion 10 in accordance with the present disclosure provides an eco-friendly alternative to EPS foam board insulation in shipping containers. The cushions 10 may be placed along the bottom, top and/or side edges of a shipping container, or against the faces of the shipping container walls, to isolate the shipped product from the outside walls of the container. The cushions 10 will provide damping for the product when the container is jostled or dropped during shipping. After the product is delivered and unpacked, the cushions 10 may be separated out with other recyclable materials from the non-recyclable materials for disposal.

The cushion 10 as illustrated and described herein is exemplary, and modifications are contemplated by the inventor as having use in cushions 10 in accordance with the present disclosure. The cardboard sheet 12 and, correspondingly, the cushion 10 may be wider in the transverse direction 24 and include more cutout sections and lands, or wider cutout sections and lands. Even at the same width, the cutout rows 82, 88, 94, 100 may include more cutout sections and lands with smaller cutout widths $W_C$ and land widths $W_L$. As discussed above, the cutout widths $W_C$ and land widths $W_L$ may be varied to adjust the overlap between the lands and the cushioning provided by the cushion 10. While illustrated in the drawing figures as being rectangular, in alternate embodiments, the cutout sections 84, 90, 96, 102 may have other geometric shapes or combinations of geometric shapes that will form the air pockets when the cardboard sheet 12 is folded into the cushion 10.

The cardboard sheet 12 may also be longer in the longitudinal direction 22 with additional horizontal and vertical plies and creases and correspondingly more rows of cutout sections and lands to increase the thickness of the cushion 10. In other embodiments, the cutout sections may be limited to spanning just a single horizontal ply versus spanning multiple plies as is the case with the cutout sections 90, 96. Additionally, terms such as "horizontal," "vertical," "first," "second" and the like are used in the preceding description to identify and distinguish various elements of the cushion 10, but those skilled in the art will understand that such designations are not limiting. For example, the horizontal plies 56-68 may be vertical and the vertical plies 70-80 may be horizontal depending on the orientation of the cushion 10 in a particular implementation. Further variations on the illustrated design are contemplated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A corrugated alternate displacement cushion comprising:
   a corrugated cardboard sheet having a longitudinal direction and a transverse direction that is perpendicular to the longitudinal direction;
   a first cutout row having first cutout sections in the corrugated cardboard sheet that are spaced in the transverse direction across the corrugated cardboard sheet and separated by first lands; and
   a second cutout row having second cutout sections in the corrugated cardboard sheet that are spaced in the transverse direction across the corrugated cardboard sheet and separated by second lands, wherein the first cutout sections do not overlap the second cutout sections in the transverse direction,
   wherein, when the corrugated cardboard sheet is folded up to form the corrugated alternate displacement cushion with a rectangular cross-section, the first lands overlay the second cutout sections and the second lands overlay the first cutout sections with the first lands and the second lands overlapping and engaging, and corresponding portions of the corrugated cardboard sheet overlay the first cutout sections and the second cutout sections on sides opposite the second lands and the first lands, respectively, and engage the second lands and the first lands, such that air pockets defined by the first cutout sections and the second cutout sections are formed within the corrugated alternate displacement cushion.

2. The corrugated alternate displacement cushion of claim 1, wherein the corrugated cardboard sheet defines horizontal plies that are stacked vertically and with adjacent pairs of the horizontal plies being connected by corresponding vertical plies, and wherein the first cutout sections and the first lands are formed in a first horizontal ply and the second cutout sections and the second lands are formed in a second horizontal ply.

3. The corrugated alternate displacement cushion of claim 1, wherein the first cutout sections do not overlap the second cutout sections in the longitudinal direction.

4. The corrugated alternate displacement cushion of claim 1, comprising creases defined in the corrugated cardboard sheet and extending parallel to the transverse direction across the corrugated cardboard sheet, wherein the creases define alternating horizontal plies and vertical plies of the corrugated alternate displacement cushion, and wherein the first cutout sections and the first lands are formed in a first horizontal ply and the second cutout sections and the second lands are formed in a second horizontal ply.

5. The corrugated alternate displacement cushion of claim 4, wherein the first cutout sections and the first lands extend in the longitudinal direction from the first horizontal ply across a first vertical ply and at least partially across a third horizontal ply that is connected to the first horizontal ply by the first vertical ply, and wherein the second cutout sections and the second lands extend in the longitudinal direction from the second horizontal ply across a second vertical ply and at least partially across a fourth horizontal ply that is connected to the second horizontal ply by the second vertical ply.

6. The corrugated alternate displacement cushion of claim 1, comprising a third cutout row having third cutout sections in the corrugated cardboard sheet that are spaced in the transverse direction across the corrugated cardboard sheet and separated by third lands, wherein the third cutout sections are aligned with the first cutout sections in the transverse direction so that the first cutout sections are vertically aligned with the third cutout sections when the corrugated cardboard sheet is folded up to form the corrugated alternate displacement cushion.

7. The corrugated alternate displacement cushion of claim 1, wherein the corrugated cardboard sheet comprises:
   an inner liner forming an inner surface;
   an outer liner forming an outer surface; and
   a fluted sheet disposed between the inner liner and the outer liner, wherein fluting of the fluted sheet defines channels within the corrugated cardboard sheet that are parallel to the longitudinal direction.

8. A corrugated alternate displacement cushion fabricated from a corrugated cardboard sheet having a longitudinal direction and a transverse direction that is perpendicular to the longitudinal direction, the corrugated alternate displacement cushion comprising:
   horizontal plies of the corrugated cardboard sheet that are stacked vertically;
   vertical plies of the corrugated cardboard sheet, wherein each of the vertical plies connects a pair of the horizontal plies to each other; and
   first cutout sections defined in a first horizontal ply of the horizontal plies, wherein the first cutout sections are spaced in the transverse direction across the first horizontal ply and are separated by first lands of the first horizontal ply, wherein the first cutout sections are enclosed by a second horizontal ply of the horizontal plies that is vertically above and engages the first horizontal ply and a third horizontal ply of the horizontal plies that is vertically below and engages the first horizontal ply to define first air pockets within the corrugated alternate displacement cushion.

9. The corrugated alternate displacement cushion of claim 8, comprising second cutout sections defined in the second horizontal ply, wherein the second cutout sections are spaced in the transverse direction across the second horizontal ply, do not overlap with the first cutout sections in the transverse direction, and are separated by second lands of the second horizontal ply, wherein the first cutout sections are enclosed by the second lands and the third horizontal ply, and wherein the second cutout sections are enclosed by the first lands and a fourth horizontal ply of the horizontal plies that is vertically above the second horizontal ply to define second air pockets within the corrugated alternate displacement cushion.

10. The corrugated alternate displacement cushion of claim 9, wherein the first lands and the second lands overlap in the transverse direction.

11. The corrugated alternate displacement cushion of claim 9, comprising third cutout sections defined in the third horizontal ply, wherein the third cutout sections are spaced in the transverse direction across the third horizontal ply, are vertically aligned with the second cutout sections, and are separated by third lands of the third horizontal ply, wherein the first cutout sections are enclosed by the second lands and the third lands, and wherein the third cutout sections are enclosed by the first lands and a fifth horizontal ply of the horizontal plies that is vertically below the third horizontal ply to define third air pockets within the corrugated alternate displacement cushion.

12. The corrugated alternate displacement cushion of claim 11, wherein each of the first cutout sections, the second cutout sections and the third cutout sections has a cutout width, and each of the first lands, the second lands and the third lands has a land width that is greater than the cutout width.

13. The corrugated alternate displacement cushion of claim 8, wherein the first cutout sections and the first lands extend across a first vertical ply of the vertical plies and at least partially across a fourth horizontal ply of the horizontal plies that is connected to the first horizontal ply by the first vertical ply.

14. The corrugated alternate displacement cushion of claim 8, wherein the corrugated cardboard sheet comprises:
an inner liner forming an inner surface;
an outer liner forming an outer surface, and
a fluted sheet disposed between the inner liner and the outer liner, wherein fluting of the fluted sheet defines channels within the corrugated cardboard sheet that are parallel to the longitudinal direction.

15. A corrugated cardboard sheet comprising:
creases extending in a transverse direction of the corrugated cardboard sheet that is perpendicular to a longitudinal direction of the corrugated cardboard sheet, wherein the creases define horizontal plies in the corrugated cardboard sheet and vertical plies in the corrugated cardboard sheet, wherein each of the vertical plies is disposed between a pair of horizontal plies, and wherein the horizontal plies are stacked vertically when the corrugated cardboard sheet is folded up around the creases;
first cutout sections and first lands extending in the longitudinal direction from a first horizontal ply of the horizontal plies across a first vertical ply of the vertical plies and at least partially across a second horizontal ply of the horizontal plies, wherein the first cutout sections are spaced in the transverse direction and separated by the first lands;
second cutout sections and second lands extending in the longitudinal direction from a third horizontal ply of the horizontal plies across a third vertical ply of the vertical plies and at least partially across a fourth horizontal ply of the horizontal plies, wherein the second cutout sections are spaced in the transverse direction and separated by the second lands, wherein the first cutout sections and the second cutout sections do not overlap in the transverse direction, and wherein the first cutout sections and the second cutout sections have a cutout width and the first lands and the second lands have a land width that is greater than the cutout width, and
wherein, when the corrugated cardboard sheet is folded up around the creases to form a corrugated alternate displacement cushion, the first horizontal ply and the second lands enclose the first cutout sections and engage portions of the corrugated cardboard sheet defining the first cutout sections to form first air pockets, and the first horizontal ply and the first lands cover an interior of the second cutout sections.

16. The corrugated cardboard sheet of claim 15, comprising third cutout sections and third lands extending in the longitudinal direction from a fifth horizontal ply of the horizontal plies across a fifth vertical ply of the vertical plies and at least partially across a sixth horizontal ply of the horizontal plies, wherein the third cutout sections are spaced in the transverse direction, are aligned in the transverse direction with the first cutout sections, and are separated by the third lands, and wherein, when the corrugated cardboard sheet is folded up around the creases, the second lands cover an interior of the third cutout sections.

17. The corrugated cardboard sheet of claim 16, wherein, when the corrugated cardboard sheet is folded up around the creases, the third lands cover an exterior of the second cutout sections to form second air pockets.

18. The corrugated cardboard sheet of claim 15, wherein the first lands and the second lands overlap in the transverse direction, and face and engage when the corrugated cardboard sheet is folded up around the creases.

19. The corrugated cardboard sheet of claim 15, wherein longitudinal lengths of the horizontal plies and the vertical plies increases as the corrugated cardboard sheet extends in the longitudinal direction from an inner transverse edge toward an outer transverse edge.

20. The corrugated alternate displacement cushion of claim 15, wherein the corrugated cardboard sheet comprises:
an inner liner forming an inner surface;
an outer liner forming an outer surface; and
a fluted sheet disposed between the inner liner and the outer liner, wherein fluting of the fluted sheet defines channels within the corrugated cardboard sheet that are parallel to the longitudinal direction.

* * * * *